Jan. 14, 1936.  A. RONNING  2,027,618

POWER TRANSMISSION

Filed April 15, 1935

INVENTOR
ADOLPH RONNING
BY
ATTORNEY

Patented Jan. 14, 1936

2,027,618

UNITED STATES PATENT OFFICE 2,027,618

POWER TRANSMISSION

Adolph Ronning, Minneapolis, Minn.

Application April 15, 1935, Serial No. 16,356

10 Claims. (Cl. 74—389)

This invention relates to power transmission mechanisms and the primary object is to provide a new, novel, and efficient device for transmitting power from a single power actuated shaft to two secondary shafts, and whereby continuous rotary motion of the single or main shaft may be converted so as to drive the second shafts selectively or simultaneously, and in either direction of rotation. A further object is to provide in such a mechanism a single control lever capable of effecting, by variously shifted positions, interconnections between the main and secondary shafts to produce the selective or simultaneous secondary shaft movements referred to. Still further and more specific objects will be disclosed in the course of the following specification, reference being had to the accompanying drawing, wherein:

Figure 2:
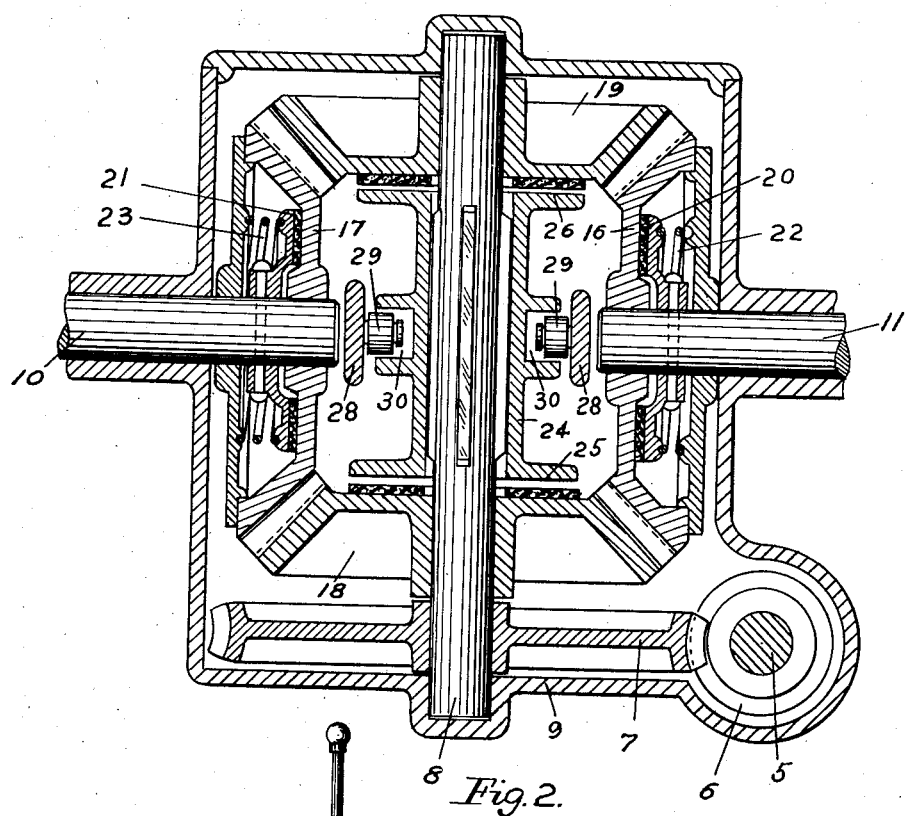
Fig. 2 is an enlarged detail sectional plan view on the line 2—2 in Fig. 1.
Figure 1:
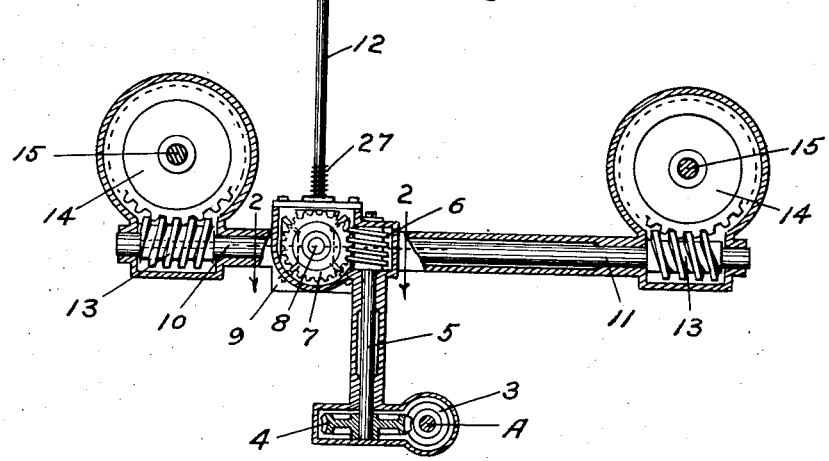
Fig. 1 is a sectional elevation through my improved transmission mechanism.

Figs. 1 and 2 correspond to Figs. 2 and 3 respectively of my copending application for patent Ser. No. 637,745, filed October 14th, 1932, for Power operated control mechanism, of which application the present application is a division; and it may here also be noted that the present disclosure is also similar to a portion of application Ser. No. 298,926, filed August 11th, 1928 (since issued as Patent No. 1,883,404) and of which said application Ser. No. 637,745 is a division.

Referring to the drawing more particularly and by reference characters, A designates a primary power shaft connected for continuous rotary motion with an engine (not shown) or other source of power. For purpose of speed reduction and power increase this shaft has a worm 3 meshing with a worm gear 4 on one end of a shaft 5, the other end of which has a worm 6 meshing with a worm gear 7 on a shaft 8 journaled in a housing 9. Other forms of power transmission to the shaft 8 may be employed, and inasmuch as shaft 8 is continuously rotated and is directly associated with the clutching and reversing mechanism of the invention it will, for purpose of convenience, be referred to as the "driving shaft" or "driving element".

The "driven shafts" are those identified by numerals 10 and 11, the inner or opposed ends of which are journaled in and project into the housing 9. It is the purpose of the invention to provide within the housing 9 a simple and compact device which, under the control of a single manually operative lever 12, will permit the shaft 8 to rotate idly with respect to shafts 10 and 11, or effect connections therewith that will drive them selectively in simultaneously similar or reverse directions.

As indicated in Fig. 1, the outer ends of the shafts 10 and 11 have worm and gear connections 13, 14, for driving shafts 15. These shafts 15 in turn may be associated with other devices or controls such as illustrated in my application Ser. No. 637,745, and the gear connections 14—15 may be substituted by other transmitting elements except in such instances as where it is desirable to provide worm locks to prevent turning of the shafts 10, 11 by rotating action or tendencies of shafts 15, particularly when the drive connections within housing 9 are inactive or idle.

It may here be noted that the present application is a division of my copending application Ser. No. 637,745, filed October 14th, 1932, for Power operated control mechanism, and which in turn is a division of original application Ser. No. 298,-926, filed August 11th, 1928, for Road maintainer, now Patent No. 1,883,404.

Again referring to the drawing of the instant application it will be seen that within the housing 9 are arranged four rectangularly disposed (Fig. 2) bevel gears 16, 17, 18, and 19, each of which constantly intermeshes with two of the others, in the manner shown. The gears 16 and 17 are respectively carried by the shafts 11 and 10 and are normally held in driving engagement therewith by spring held friction clutches 20 and 21, having springs 22 and 23 and contained within the gears which are hollow. It may here be explained that the shafts 11 and 10 are so mounted that they have freedom for limited sliding movements, and when either of them is pushed outwardly it will carry with it the friction disk of the clutch, so as to release the same from the gear and thus permit the latter to rotate without rotating the shaft. The gears 18 and 19 are carried upon the stub or driving shaft 8, that normally idles within these gears which are normally free of driving engagement with the shaft.

A clutch collar 24 is slidably keyed upon the shaft 8, between the two bevel gears 18 and 19, and is provided with friction faces 25 and 26, at its ends, for selective driving contact with the said gears. This clutch collar is operated by the shipper lever 12 which is universally pivoted in the cover of the housing 9 so that it may be moved in any direction, much as with the gear shift lever of a motor vehicle. A spring 27 (Fig. 1) secured to the casing cover 9 tends to return and hold the lever in an inactive vertical position.

The lower end of the lever is bifurcated, having two fingers 28 provided with roller pins 29, traveling in an annular channel 30 of and for longitudinally shifting the sleeve 24 on the shaft 8. It will be noted that the fingers 28 are only slightly spaced from the ends of the shafts 10 and 11, which project slightly within the gears 16, 17, and that there is sufficient play between the members 28 and 24 to permit a slight transverse movement of the fingers whereby they may act against the shafts 10, 11 and thereby selectively disengage the clutches 20 and 21.

When the shipper lever is pulled straight back it closes the clutch connection 25 between the members 24 and 18. This action applies power from the engine driven shaft A to the gear 18, causing all the gears 16—19 to rotate, and transmitting motion through the elements 16, 17, 20, 21, 11, 10, and 14, and consequently rotates both shafts 15 in opposite directions.

When the shipper lever 12 is pushed in the opposite direction it closes driving contact at 26, thus reversing the direction of transmitted motion to the shafts 10 and 11 (and shafts 15).

If the operator desires to for instance rotate only one of the shafts 10 or 11 he moves the lever 12 either forwardly or rearwardly, depending on movement direction required, and at the same time pushes it to one side or the other, depending on which shaft 10 or 11 is to be idled, and by so doing he presses the shaft 10 or 11, to be idled, outwardly thus disengaging it (at 20 or 21) from driving contact. When so disengaged the idled shaft will be locked against accidental or reversed rotation by virtue of the worm gear action at 13—14.

It will thus be seen that by slightly moving and pressing the shipper lever 12 back and forth and from one side to the other, the operator is able, with a minimum amount of effort, to control the application and direction of power transmitted to the shafts 10 and 11 and any mechanism with which they may be operatively associated.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A control mechanism of the character set forth comprising a driving shaft disposed intermediate the ends of two driven shafts arranged at right angles with respect thereto, intermeshing gears on said driving and driven shafts, clutches for respectively connecting and disconnecting the driving and driven shafts and gears, and a single shipper lever movable in a plurality of directions for controlling all of said clutches.

2. A power transmission comprising a driving shaft and a pair of driven shafts, four intermeshing gears, two on the driving shaft and one on each of the driven shafts, clutches for connecting and disconnecting each of said gears with its shaft, and a single control member for operating said clutches.

3. A power transmission mechanism comprising a housing, a pair of driven shafts having opposed ends extending into the housing, a driving shaft in the housing and disposed at substantially right angles to and between said opposed shaft ends, four intermeshing bevel gears mounted two on the driving shaft and one on each of the driven shafts, clutches and gears connecting the shafts within the housing, and a single control member extending from the housing for controlling the clutch and gear connections therewithin.

4. A power transmission comprising a driving shaft and a pair of driven shafts, four intermeshing gears, two on the driving shaft and one on each of the driven shafts, a clutch mechanism for selectively establishing driving connections between the driving shaft and the two gears thereon, normally closed clutches respectively establishing driving connections between the driven shafts and the gears thereon, a shift member movable in fore and aft directions to operate said clutch mechanism and movable in transverse directions to selectively engage and open the said normally closed clutches.

5. A power transmission comprising a driving shaft and a pair of driven shafts, four intermeshing gears, two on the driving shaft and one on each of the driven shafts, clutches for connecting and disconnecting each of said gears with its shaft, and a single control member for operating said clutches, said clutches each including two friction contact members capable of translating power from one to the other in proportion to the applied friction creating pressure.

6. A power transmission comprising driving and driven shafts disposed at angles with respect to each other, gears for transmitting power between said shafts, a plurality of clutches, at least one for each of said shafts, and for operatively connecting it with said gears, and a shift member movable in a plurality of directions to selectively operate all of said clutches.

7. A power transmission mechanism comprising a housing, a pair of driven shafts having opposed ends extending into the housing, a driving shaft in the housing and disposed at substantially right angles to and between said opposed shaft ends, four intermeshing bevel gears mounted two on the driving shaft and one on each of the driven shafts, the gears on the driving shaft having opposed friction faces, a collar slidable on the driving shaft between said gears and with friction faces at its end to engage said gear friction faces and for transmitting power thereto in proportion to the friction pressure applied, a shift lever movable in the plane of the driving shaft to actuate the collar and produce such friction pressure, clutches for interconnecting the driven shafts with the gears thereon, and means operative by movement of the shift lever in a direction other than in the plane of the driving shaft for controlling the driven shaft clutches.

8. A power transmission mechanism comprising a housing, a pair of driven shafts having opposed ends extending into the housing, a driving shaft in the housing and disposed at substantially right angles to and between said opposed shaft ends, four intermeshing bevel gears mounted two on the driving shaft and one on each of the driven shafts, the gears on the driving shaft having opposed friction faces, a collar slidable on the driving shaft between said gears and with friction faces at its end to engage said gear friction faces and for transmitting power thereto in proportion to the friction pressure applied, a shift lever movable in the plane of the driving shaft to actuate the collar and produce such friction pressure, clutches for interconnecting the driven shafts with the gears thereon, and means operative by movement of the shift lever in a direction other than in the plane of the driving shaft for controlling the driven shaft clutches, said driven shaft clutches each including a pair of friction contact members permitting slippage in response to predetermined resistance by the driven member.

9. A power transmission mechanism comprising a housing, a pair of driven shafts having opposed ends extending into the housing, a driving shaft in the housing and disposed at substantially right angles to and between said opposed shaft ends, four intermeshing bevel gears mounted two on the driving shaft and one on each of the driven shafts, normally open friction clutches having members slidable on the driving shaft and for selectively connecting it to the gears thereon, normally closed friction clutches connecting the driven shafts to the respective gears thereon, a shift lever selectively movable in right angular directions to selectively operate all of said clutches, and movable in a relatively angular direction to simultaneously operate two of said clutches.

10. A transmission mechanism comprising a driving shaft disposed intermediate the ends of two driven shafts arranged at right angles with respect thereto, intermeshing gears on said driving and driven shafts, normally closed clutches connecting the driven shafts with the gears thereon, said driven shafts having freedom for limited sliding movement with respect to the gears thereon, and means operative by longitudinally actuating the driven shafts to selectively open said normally closed clutches.

ADOLPH RONNING.

CERTIFICATE OF CORRECTION.

Patent No. 2,027,618.   January 14, 1936.

ADOLPH RONNING.

It is hereby certified that error appears in the heading to the printed specification of the above numbered patent requiring correction as follows: Line 4, strike out the application clause and insert instead "Original application August 11, 1928, Serial No. 298,926. Divided and application October 14, 1932, Serial No. 637,745, which in turn was divided and this application April 15, 1935, Serial No. 16,356; and that the said Letters Patent should be read with this correction therein that the same may conform to the record of the case in the Patent Office.

Signed and sealed this 3rd day of March, A. D. 1936.

(Seal)

Leslie Frazer
Acting Commissioner of Patents.